Figure 1:
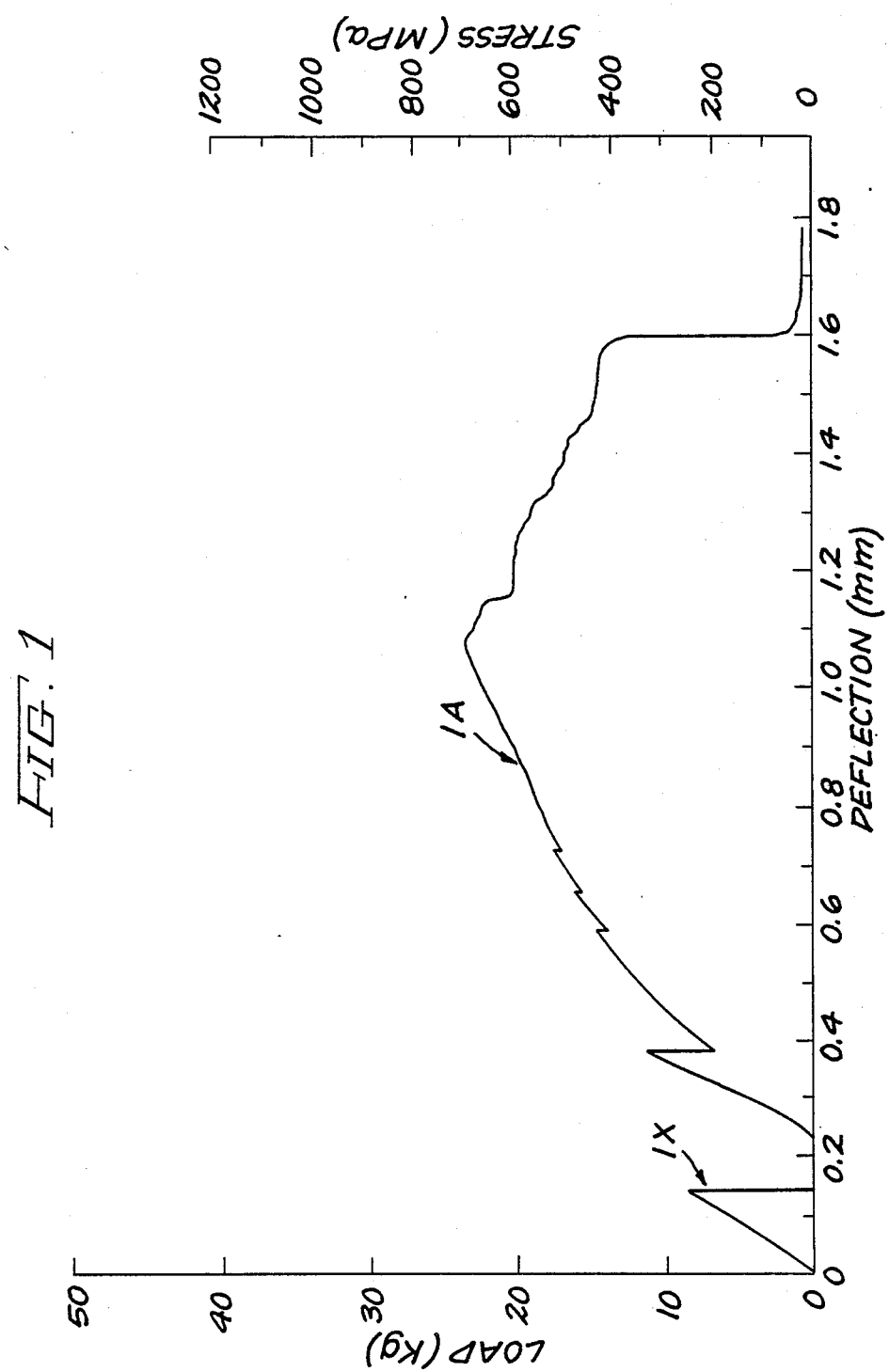

United States Patent [19]

Singh et al.

[11] Patent Number: 4,915,760
[45] Date of Patent: Apr. 10, 1990

[54] METHOD OF PRODUCING A COATED FIBER-CONTAINING COMPOSITE

[75] Inventors: Raj N. Singh, Schenectady; Achuta R. Gaddipati, Scotia, both of N.Y.

[73] Assignee: General Electric Company, Schenectady, N.Y.

[21] Appl. No.: 262,651

[22] Filed: Oct. 26, 1988

[51] Int. Cl.⁴ ............................................. C04B 37/04
[52] U.S. Cl. ...................................... 156/89; 264/60; 428/245; 428/255; 427/255; 427/249; 427/419.7
[58] Field of Search ................... 427/255, 419.7, 249; 428/245, 255; 264/60; 156/89

[56] References Cited

U.S. PATENT DOCUMENTS 3,991,248 11/1976 Bauer ................................ 428/245
4,580,524 4/1986 Lackey, Jr. et al. ............. 427/255.2
4,605,588 8/1986 Simpson et al. .................... 427/255
4,642,271 2/1987 Rice .................................... 428/698
4,752,503 6/1988 Thebault ......................... 427/255.2
4,764,427 8/1988 Hara et al. ......................... 428/400
4,781,993 11/1988 Bhatt .................................. 428/698

Primary Examiner—Stephen J. Lechert, Jr.
Assistant Examiner—Ngoclan Mai
Attorney, Agent, or Firm—Jane M. Binkowski; James C. Davis, Jr.; James Magee, Jr.

[57] ABSTRACT

A composite is produced by depositing an organic slurry of ceramic matrix-forming material on a layer of boron nitride coated fibrous material forming a tape therewith on drying, forming a layered structure of the tapes, laminating the structure, firing the laminated structure to burn out organic material and hot pressing the resulting porous structure to form a composite.

13 Claims, 2 Drawing Sheets

METHOD OF PRODUCING A COATED FIBER-CONTAINING COMPOSITE

This application is related to U.S. Serial No. 132,753, filed on Dec. 14, 1987, U.S. Serial No. 135,858, filed on Dec. 21, 1987, and Serial No. (260201), filed Oct. 20, 1988, all for Singh et al., assigned to the assignee herein and incorporated herein by reference. The referenced applications are directed to the production of filament-containing composites.

The present invention is directed to producing a boron nitride coated fiber-reinforced ceramic matrix composite.

Fiber reinforcement of brittle ceramic materials offers significant opportunities for toughening of the brittle matrix. For this reason ceramic matrices are being incorporated into fiber preforms for the fabrication of ceramic matrix composites. Several techniques for incorporating the ceramic matrix into a fiber preform have been tried. These are: filament-winding through a slurry of the matrix material, chemical vapor infiltration and sol-gel infiltration techniques. In passing a filament winding through a slurry of the matrix, relatively small amounts of the matrix adhere to the filaments. Chemical vapor infiltration and sol-gel infiltration techniques are slow. Conventional ceramic processing techniques such as slip casting and/or vacuum casting techniques followed by hot-pressing do not provide good penetration of the matrix material between the reinforcing fiber preforms thereby leaving large voids in the preform. These difficulties are overcome by the present invention.

In the present process, an organic slurry of ceramic matrix-forming material is cast onto boron nitride coated fibrous material to form a tape therewith, a plurality of the tapes are formed into a layered structure, which is then laminated, fired to burn out binder, and hot-pressed for consolidation.

Figure 2:
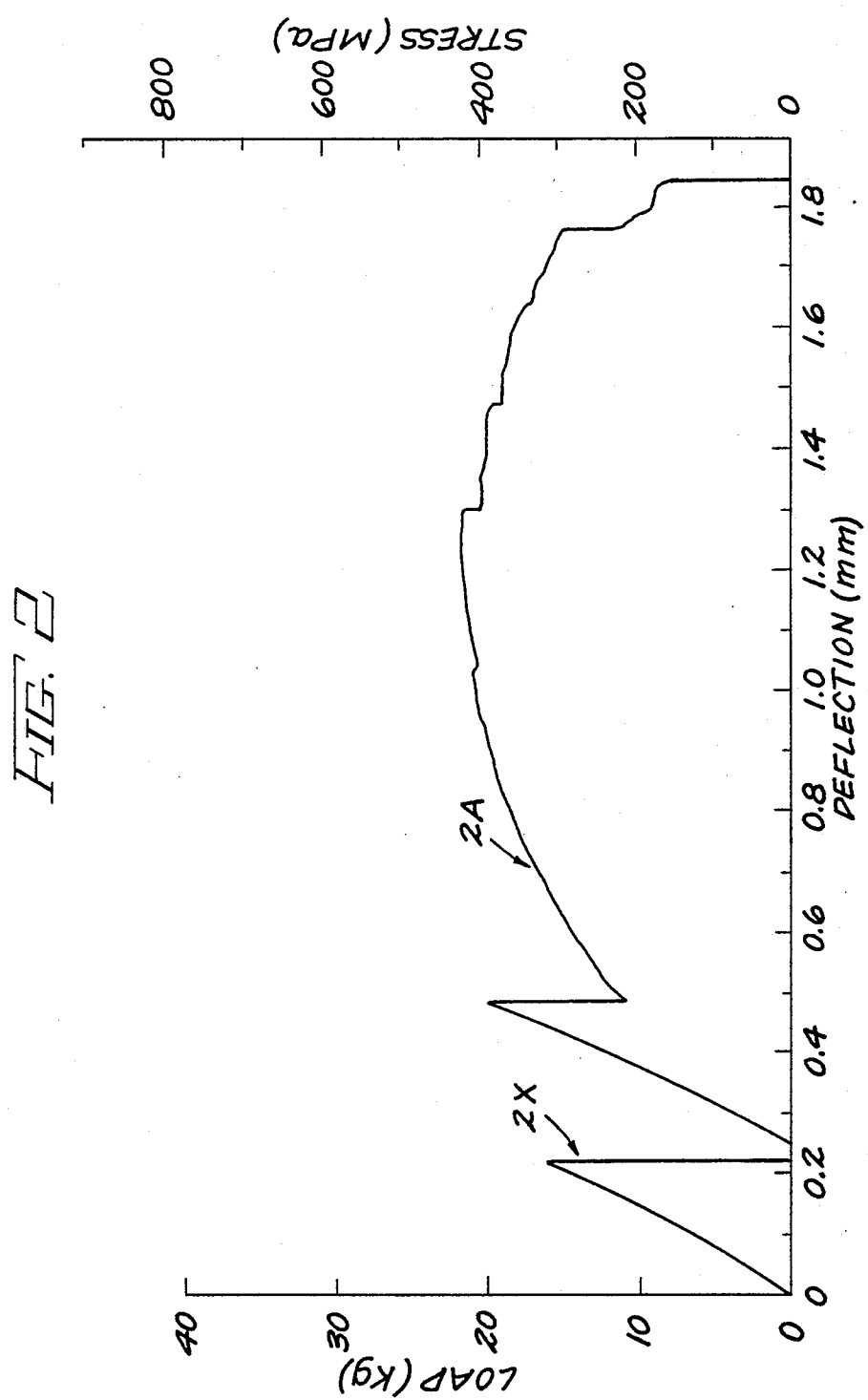

Those skilled in the art will gain a further and better understanding of the present invention from the detailed description set forth below, considered in conjunction with the accompanying figures which form a part of the specification wherein:

FIG. 1 shows a graph (labelled 1A) illustrating the load deflection behavior of the present composite comprised of boron nitride coated filaments in a zircon matrix, and another graph (labelled 1X) illustrating the load deflection behavior of a monolithic body of zircon; and FIG. 2 shows a graph (labelled 2A) illustrating the load-deflection behavior of the present composite comprised of whiskers and boron nitride coated filaments in a zircon matrix, and another graph (labelled 2X) illustrating the load deflection behavior of a composite comprised of zircon and whiskers.

Briefly stated, the present process for producing a composite comprises:

(a) providing matrix-forming ceramic particulate material and organic binding material;
(b) forming a slurry of said matrix-forming ceramic material and organic binding material in a liquid medium;
(c) depositing a coating of boron nitride on fibrous material leaving no significant portion thereof exposed;
(d) providing said boron nitride coated fibrous material substantially as a layer;
(d) casting said slurry onto said coated fibrous material in an amount sufficient to form a tape therewith;
(f) evaporating said liquid medium forming a tape;
(g) assembling a plurality of said tapes to produce a layered structure;
(h) laminating the layered structure to form a laminated structure;
(i) firing said laminated structure to remove said organic binding material leaving no significant deleterious residue; and
(j) hot pressing the resulting porous structure at a sufficient temperature under a sufficient pressure for a sufficient period of time to consolidate said structure to produce said composite having a porosity of less than about 10% by volume, said composite containing no significant amount of reaction product of said coated fibrous material and said matrix, said matrix having a thermal expansion coefficient which ranges from lower than that of said coated fibrous material to less than about 15% higher than that of said coated fibrous material, at least about 10% by volume of said composite being comprised of said coated fibrous material.

As used herein "fibrous material" includes fibers, filaments, continuous fiaments, strands, bundles, whiskers, cloth, felt and any combination thereof. The fibrous material can be amorphous, crystalline or a mixture thereof. The crystalline fibrous material can be single crystal and/or polycrystalline.

In one embodiment the fibrous material is a carbon-containing material which contains carbon in an amount of at least about 1% by weight, frequently at least about 5% by weight, of the fibrous material.

In another embodiment, the fibrous material is selected from the group consisting of aluminum oxide, mullite, elemental carbon, a SiC-containing material, a silicon nitride-containing material, silicon nitride, and any combination thereof.

As used herein, "elemental carbon" includes all forms of elemental carbon including graphite.

Reference herein to a fibrous material of silicon carbide, includes, among others, presently available materials wherein silicon carbide envelops a core or substrate, and which generally are produced by chemical vapor deposition of silicon carbide on a core or substrate such as, for example, elemental carbon or tungsten.

The SiC-containing fibrous material generally contains at least about 50% by weight of silicon and at least about 25% by weight of carbon, based on the weight of the fibrous material. Examples of SiC-containing materials are silicon carbide, Si—C—O, Si—C—O—N, Si—C—O-Metal and Si—C—O—N—Metal, where the Metal component can vary but frequently is Ti or and wherein O, N and Metal are present generally in an amount of at least about 1% by weight of the fibrous material.

The silicon nitride-containing fibrous material contains at least about 50% by weight of silicon and at least about 25% by weight of nitrogen based on the weight of said fibrous material and is selected from the group consisting of Si—N—O, Si—C—O—N, Si—N-—O—Metal, and Si—C—O—Metal, wherein said O, C, and Metal are each present in an amount of at least about 1% by weight of said fibrous material.

There are processes known in the art which use organic precursors to produce SiC- and silicon nitride-containing fibrous materials which may introduce a wide variety of elements into the fibrous material.

The fibrous material is stable at the temperature of the present process. Preferably, the fibrous material has in air at ambient or room temperature, i.e. from about 20° C. to about 30° C., a minimum tensile strength of about 100,000 psi and a minimum tensile modulus of about 25 million psi.

In carrying out the present process, boron nitride is coated on the fibrous material to produce a coating thereon which leaves no significant portion of the fibrous material exposed. The boron nitride coating should be continuous, free of any significant porosity and preferably it is pore-free. Preferably, the boron nitride coating is of uniform or at least significantly uniform thickness.

The boron nitride coating can be deposited on the fibrous material by a number of known techniques under conditions which have no significant deleterious effect on the fibrous material. Generally, the boron nitride coating can be deposited by chemical vapor deposition by reactions such as:

$$B_3N_3H_6(g) \rightarrow 3BN(s) + 3H_2(g) \qquad (1)$$

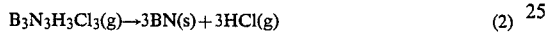

$$B_3N_3H_3Cl_3(g) \rightarrow 3BN(s) + 3HCl(g) \qquad (2)$$

$$BCl_3(g) + NH_3(g) \rightarrow BN(s) + 3HCl(g) \qquad (3)$$

Generally, the chemical vapor deposition of boron nitride is carried out at temperatures ranging from about 900° C. to 1800° C. in a partial vacuum, with the particular processing conditions being known in the art or determinable empirically.

The boron nitride coating should be at least sufficiently thick to be continuous and sufficiently thin so that the thermal expansion coefficient of the boron nitride coated fibrous material is the same as, or not significantly different from, that of the uncoated fibrous material. The boron nitride coating should leave none, or no significant portion, of the fibrous material exposed. Generally, the thickness of the coating ranges from about 0.3 microns to about 5 microns, and typically it is about 0.5 microns. The particular thickness of the coating is determinable empirically, i.e. it should be sufficient to prevent reaction, or prevent significant reaction, between the fibrous material and the matrix-forming material under the particular processing conditions used or under the particular conditions of use of the resulting hot pressed composite. In the present invention, the boron nitride coating bars contact, or bars significant contact, between the fibrous material and the matrix-forming material or matrix.

In carrying out the present process, the boron nitride coated fibrous material is provided substantially as a layer. The layer of coated fibrous material can be continuous or discontinuous and it contains sufficient spacing to permit production of the present composite. Specifically, there is sufficient spacing between the coated fibers, filaments, strands, bundles, or whiskers to permit penetration thereof by the ceramic particulates to produce the present composite. The extent of the spacing in the layer of coated fibrous material is determined empirically and depends largely on the size of the ceramic particulates and the particular composite desired.

The matrix-forming material is comprised of ceramic particulates. These particulates are inorganic, crystalline, and in the present process, they are consolidated, i.e. they undergo solid state sintering, to produce the present solid composite. The matrix-forming particulates can be comprised of an oxide-based ceramic such as, for example, aluminum oxide. mullite or zircon. Other suitable matrix-forming materials are silicon carbide and silicon nitride. The particulates are of a size which can penetrate the spaces in the layer of fibrous material sufficiently to produce the present composite. Generally, the ceramic particles have a specific surface area ranging from about 0.2 to about 10 meters$^2$ per gram, and frequently, ranging from about 2 to about 4 meters$^2$ per gram.

In the present invention, the matrix-forming material, or matrix in the composite, has a thermal expansion coefficient ranging from lower than that of the coated fibrous material to less than about 15% higher than that of the coated fibrous material. Depending on such factors as fiber or filament size, alignment of the fibers or filaments and the particular processing conditions, a matrix-forming material with a thermal expansion coefficient about 15% or more higher than that of the coated fibrous material may result in a matrix with significantly deleterious cracks which would render the composite substantially less useful. Preferably, for optimum mechanical properties of the composite, the matrix-forming material, or matrix, has a thermal expansion coefficient ranging from less than to about the same as that of the coated fibrous material.

In the present process the components of the composite are solid. Also, there is no significant amount of reaction product formed, or no reaction product detectable by scanning electron microscopy, between the ceramic matrix and any other component of the present composite.

In one embodiment of the present process, a slurry of the ceramic particulates and organic binding material is formed.

In another embodiment of the present process, a slurry of the ceramic particulates, the present fibrous material in the form of whiskers, preferably crystalline inorganic whiskers, and organic binding material is formed.

The whiskers in the slurry may or may not be coated with boron nitride depending largely on the particular whiskers used and the particular composite desired. Generally, boron nitride coating on the whiskers improves toughness of the ceramic matrix phase. Generally, the whiskers or coated whiskers are less than about 50 microns in length and less than about 10 microns in diameter. Generally, the whiskers or coated whiskers in the slurry range up to about 50%, or from about 1% to about 30%, or from about 20% to about 30%, by volume of the matrix-forming material. The whiskers in the slurry may or may not penetrate the spaces in the layer of fibrous material depending largely on the size of the whiskers. Preferably, the whiskers introduced by the slurry are silicon carbide or silicon nitride.

The organic binding material used in the present process bonds the ceramic particulates and fibrous material together and enables formation of tape of desired thickness and solids content. By solids content, it is meant herein the content of matrix-forming material and fibrous material including boron nitride coating. The organic binding material, i.e. that component of the tape other than its solids content, thermally decomposes at an elevated temperature ranging to below about 800° C., generally from about 50° C. to below about 800° C., and preferably from about 100° C., to about 500° C., to gaseous product of decomposition which vaporizes away leaving no significant deleterious residue.

The organic binding material is a thermoplastic material with a composition which can vary widely and which is well known in the art or can be determined empirically. Besides an organic polymeric binder it can include an organic plasticizer therefor to impart flexibility. The amount of plasticizer can vary widely depending largely on the particular binder used and the flexibility desired, but typically, it ranges up to about 50% by weight of the total organic content. Preferably the organic binding material is soluble in a volatile solvent.

Representative of useful organic binders are polyvinyl acetates, polyamides, polyvinyl acrylates, polymethacrylates, polyvinyl alcohols, polyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol and glycerol trioleate.

In carrying out the present process, the matrix-forming particles and organic binding material along with any whiskers are admixed with a liquid medium to form a suspension or slurry which preferably is uniform or at least substantially uniform. A number of conventional techniques can be used to form the slurry. Generally, the components are milled in an organic solvent in which the organic material is soluble or at least partially soluble to produce a castable suspension or slurry, i.e. a slurry suitable for depositing on the layer of coated fibrous material to form a tape therewith. Examples of suitable solvents are methyl ethyl ketone, toluene and alcohol.

The tape can be cast by a number of conventional techniques. Preferably, the layer of coated fibrous material is deposited on a carrier from which the resulting tape can be easily released such as Teflon. The slurry can be deposited on the layer of coated fibrous material to form a tape therewith of desired thickness and solids content which is determined empirically. Frequently, the slurry is cast on the layer of coated fibrous material by doctor blading. The cast tape is dried to evaporate the solvent therefrom to produce the present tape which is then removed from the carrier.

The particular amount of organic binding material used in forming the slurry is determined empirically and depends largely on the amount and distribution of solids desired in the resulting tape. Generally, the organic binding material ranges from about 25% by volume to about 50% by volume of the solids content of the tape.

The present tape or sheet can be as long and as wide as desired, and generally it is of uniform or substantially uniform thickness. Its thickness depends largely on the volume fraction of fibrous material which must be accommodated and the particular composite desired and is determinable empirically. The tape should be at least sufficiently thick to contain an amount of matrix-forming ceramic particulates and fibrous material to produce the desired composite. Generally, with increasing volume fractions of fibrous material, correspondingly smaller amounts of matrix-forming material would be required. Generally, the tape has a thickness ranging from about 25 microns (0.001 inch) to about 1300 microns (0.052 inch), frequently ranging from about 125 microns (0.005 inch) to about 1000 microns (0.040 inch), and more frequently ranging from about 250 microns (0.01 inch) to about 500 microns (0.02 inch).

In one embodiment of the present invention, the fibrous material is comprised of boron nitride coated filaments preferably with a diameter of at least about 50 microns. Preferably, the diameter of the coated filament ranges from about 50 microns to about 250 microns, frequently from about 70 microns to about 200 microns, or from about 100 microns to about 150 microns. The filament is continuous and can be as long as desired. It has a minimum length of at least about 10 times its diameter, and generally, it is longer than about 1000 microns, or it is longer than about 2000 microns. The minimum diameter of the coated filament depends largely on the minimum spacing required between the coated filaments through which the matrix-forming particles must penetrate and is determined empirically. For a given volume fraction of coated filament, as the diameter of the coated filament decreases, the total amount of space between coated filaments decreases making it more difficult for the ceramic particles to penetrate the space.

Preferably, a preform comprised of a layer of continuous boron nitride coated filaments which are spaced from each other and which are parallel, or at least substantially parallel, to each other is used. The minimum space between the coated filaments is at least sufficient to enable the matrix-forming material to penetrate therebetween, and generally, it is at least about 50 microns, and frequently at least about 100 microns. Generally, the spacing between coated filaments in a single layer is substantially equivalent, or if desired, it can vary. Filament loading in the composite can be varied by changing the spacing between the coated filaments and/or tape thickness. In a preferred embodiment the filaments are comprised of silicon carbide or elemental carbon and the slurry contains whiskers of silicon carbide. The present invention enables the production of a composite with a high volume fraction of uniaxially aligned spaced continuous coated filaments.

The preform of coated filaments can be produced by a number of conventional techniques. For example, the coated filaments can be uniaxially aligned and spaced by placing them in a suitable device provided with grooves and the desired spacing. The layer of coated filaments can be lifted off the device with adhesive tape placed across both ends of the filaments. The slurry can then be deposited on the layer of coated filaments to produce a tape therewith. If desired, the taped end portions of the filaments can eventually be cut away from the laminated structure.

In carrying out the present process, a plurality of the tapes is assembled into a layered structure. The number of tapes used can vary widely depending largely on the particular composite desired. Preferably, the tapes in the layered structure are at least substantially coextensive with each other, i.e. substantially a sandwich-type structure.

In one embodiment, before assembly of the layered structure, a solution of the present organic binder in organic solvent is deposited, generally sprayed, on the faces of the tapes to be contacted with each other, dried to evaporate the solvent and leave a sticky film of organic binder to enhance adhesion. The concentration of organic binder in solution can vary widely and generally ranges from about 1% by weight to about 10% by weight of the solution. The solution is sprayed on the face of the tape for a period of time, determinable empirically, so that on evaporation of the solvent sufficient sticky binder remains to significantly enhance adhesion or facilitate bonding of the tapes. Preferably, drying is carried out in air at ambient temperature in less than a minute, and typically, in a few seconds. The deposited binder can be a continuous or a discontinuous coating, and typically, 0.2 milligrams of sticky binder per square centimeter of surface is adequate.

The layered structure is then laminated under a pressure and temperature determined empirically depending largely on the particular composition of the organic binding material to form a laminated structure. Lamination can be carried out in a conventional manner. Laminating temperature should be below the temperature at which there is decomposition, or significant decomposition, of organic binding material and generally, an elevated temperature below 150° C. is useful and there is no significant advantage in using higher temperatures. Typically, the lamination temperature ranges from about 35° C. to about 95° C. and the pressure ranges from about 500 psi to about 3000 psi. Generally, lamination time ranges from about ½ to about 5 minutes. Also, generally, lamination is carried out in air.

If desired, the laminated structure can be cut to desired dimensions by suitable means such as a diamond saw.

The laminated structure is heated to thermally decompose the organic binding material therein producing a porous structure comprised of the boron nitride coated fibrous material, any uncoated whiskers, and ceramic matrix-forming material. The rate of heating depends largely on the thickness of the sample and on furnace characteristics. At a firing temperature ranging up to about 500° C., a slower heating rate is desirable because of the larger amounts of gas generated at these temperatures by the decomposition of the organic binding material. Typically, the heating rate for a sample of less than about 6 millimeters (6000 microns) in thickness can range from about 15° C. per hour to about 30° C. per hour. At a temperature of less than about 800° C., thermal decomposition is completed leaving no significant deleterious residue.

Thermal decomposition can be carried out in any atmosphere, preferably at about or below atmospheric pressure, which has no significant deleterious effect on the sample such as, for example, argon. Preferably, thermal decomposition is carried out in a partial vacuum to aid in removal of gases.

The resulting porous structure is hot pressed at a sufficient temperature under a sufficient pressure for a sufficient period of time to consolidate the structure to produce the present composite. The particular pressure, temperature and time are determinable empirically and are interdependent. Hot pressing temperature can vary depending largely on the characteristics of the matrix-forming material, the applied pressure and hot pressing time. Generally under higher applied pressures and longer times, lower hot pressing temperatures can be used. Likewise, under lower applied pressures and shorter times, higher hot pressing temperatures would be used. Generally, the hot pressing temperature is at least about 1400° C., generally ranging from about 1400° C. to about 1700° C., frequently from about 1500° C. to about 1650° C., and more frequently from about 1550° C. to about 1600° C. Generally, temperatures below about 1400° C. are likely to produce a composite having a porosity greater than about 5% whereas temperatures above about 1700° C. may coarsen the grains in the product and not effect density.

Generally, hot pressing pressure ranges from higher than about 100 psi to a maximum pressure which is limited by the creep of the sample, i.e. there should be no significant deformation by creep of the sample. Frequently, hot pressing pressure ranges from about 1000 psi or about 2000 psi to about 8000 psi. It is advantageous to use a pressure close to the maximum available because the application of such high pressure makes it possible to keep the pressing temperature low enough to control grain growth. Generally, hot pressing is carried out in a period of time ranging up to about 30 minutes and longer periods of time usually do not provide any significant advantage.

Hot pressing is carried out in a non-oxidizing atmosphere. More particularly, it is carried out in a protective atmosphere in which the sample is substantially inert, i.e. an atmosphere which has no significant deleterious effect thereon. Representative of the hot pressing atmospheres is nitrogen, argon, helium or a vacuum. The hot pressing atmosphere generally can range from a substantial vacuum to about atmospheric pressure.

In the present process, there is no loss, or no significant loss, of the components forming the present composite, i.e. boron nitride coated fibrous material, any uncoated whiskers, and matrix-forming material.

In one embodiment, the present composite is comprised of ceramic matrix and boron nitride coated fibrous material. In another embodiment, the composite is comprised of ceramic matrix, boron nitride coated fibrous material and whiskers which are not coated with boron nitride. The ceramic matrix is continuous and interconnecting. It is distributed in the coated fibrous material, as well as any whiskers, and generally it is space filling or substantially completely space filling. Generally, the matrix is in direct contact with more than 70% of the surface area of the boron nitride coated fibrous material and any uncoated whiskers. Frequently, the ceramic matrix coats or envelops each coated fiber, filament, strand, bundle or whisker of the boron nitride coated fibrous material and any uncoated whisker sufficiently to be in direct contact with more than 80%, preferably more than 90%, more preferably more than 99%, of the surface area of the boron nitride coated fibrous material and any uncoated whisker in the composite.

The ceramic matrix is present in the composite in an amount of at least about 30% by volume of the composite. The matrix is comprised of a solid state sintered polycrystalline phase. Preferably, the ceramic matrix phase has an average grain size of less than about 100 microns, or less than about 50 microns, or less than about 20 microns, and most preferably less than about 10 microns.

The boron nitride coated fibrous material comprises at least about 10% by volume of the composite. Generally, the boron nitride coated fibrous material, or boron nitride coated fibrous material and any uncoated whiskers, ranges from about 10% or greater than about 10% by volume to about 70% by volume, frequently from about 20% by volume to about 60% by volume, or from about 30% by volume to about 50% by volume, of the composite.

The boron nitride coating on the fibrous material in the composite is detectable by scanning electron microscopy and generally ranges in thickness from about 0.5 microns to about 1.5 microns. The particular amount of boron nitride in the composite provided by the boron nitride coating depends largely on the amount of coated fibrous material present, the thickness of the boron nitride coating and the diameter of the fiber, filament, or whisker. Therefore, the volume fraction of boron nitride provided by the coating is the balance of the volume fraction of all other components of the composite. Frequently, however, the boron nitride coating on the fibrous material in the composite generally ranges from less than about 1% by volume to about 20% by volume, or from about 1% by volume to about 10% by volume, or from about 1% by volume to about 5% by volume, of the total volume of boron nitride coated fibrous material. The boron nitride coating can be amorphous, crystalline, or a combination thereof.

The boron nitride coating generally optimizes interfacial shear stress between the fibrous material and ceramic matrix resulting in a composite with a toughness significantly higher than that of a composite wherein the fibrous material is uncoated.

In one embodiment, the present composite is comprised of a plurality of layers of boron nitride coated fibrous material in the ceramic matrix wherein the coated fibrous layers are substantially parallel to each other and separated from each other by ceramic matrix. The ceramic matrix is distributed in each layer of coated fibrous material generally significantly or substantially uniformly. In addition to the layers of boron nitride coated fibrous material, the ceramic matrix may contain coated or uncoated whiskers, which had been incorporated by the slurry, which may range up to about 50%, frequently from about 1% to about 30%, or from about 20% to about 30%, by volume of the ceramic matrix. Generally, the whiskers are contained in the ceramic matrix between layers of boron nitride coated fibrous material, i.e. at least between two layers of coated fibrous material. The whiskers may also be detected within the boron nitride coated fibrous layer depending largely on shape and size of the whiskers, spacing contained in the coated fibrous layer. Any difference in composition between the coated fibrous layer and whiskers and particle size of the ceramic.

In another embodiment, the composite contains a plurality of layers of boron nitride coated filaments, there is no contact between the layers and they are separated by ceramic matrix. In each layer, more than 99% by volume of the coated filaments, and preferably all or substantially all of the coated filaments, are spaced from each other and parallel or at least substantially parallel, to each other. More than 99% by volume or substantially all of the coated filaments in each layer are aligned, or substantially aligned, in a single plane. Any misalignment of the coated filaments should not significantly degrade the mechanical properties of the composite. Also, more than 99% or substantially all of the surface area of the coated filaments is in direct contact with the ceramic matrix. Also, boron nitride coated and/or uncoated whiskers may be present up to about 50% by volume of the ceramic matrix.

The boron nitride coating optimizes interfacial shear stress between the filaments and matrix resulting in a composite with a toughness significantly or substantially higher than that of a composite wherein the filaments are uncoated. Specifically, if the matrix and filaments were in direct contact, even a slight reaction therebetween would increase interfacial bonding thereby requiring a higher stress to pull out the filaments making the composite less tough. If the interfacial bonding were too high, then the composite would fail in a brittle manner. In contrast, the present boron nitride coating provides an interfacial shear stress which is significantly lower than that produced with uncoated filaments thereby allowing the coated filaments to pull out more easily and gives the composite more toughness. The coated filaments prevent brittle fracture of the composite at room temperature. By brittle fracture of a composite it is meant herein that the entire composite cracks apart at the plane of fracture. In contrast to a brittle fracture, this embodiment of the composite exhibits filament pull-out on fracture at room temperature. Specifically, as this composite cracks open, generally at least about 10% by volume, frequently at least about 30% or 50% by volume, of the coated filaments, and preferably all of the coated filaments, pull out and do not break at the plane of fracture at room temperature.

One particular advantage of this invention is that the present composite can be produced directly in a wide range of sizes. For example, it can be as long or as thick as desired.

The present composite has a porosity of less than about 10%, preferably less than about 5%, more preferably less than about 1%, by volume of the composite. Most preferably, the composite is void- or pore-free, or has no significant porosity, or has no porosity detectable by scanning electron microscopy. Generally, any voids or pores in the composites are less than about 70 microns, preferably less than about 50 microns or less than about 10 microns, and generally they are distributed in the composite.

The present composite has a wide range of applications depending largely on its particular composition. For example, it is useful as a wear resistant part, acoustical part or high-temperature structural component.

The invention is further illustrated by the following examples where, unless otherwise stated, the procedure was as follows:

Commercially available continuous filaments of silicon carbide produced by a chemical vapor deposition process and sold under the trademark AVCO SCS-6 were used. These filaments had a 35 micron carbon core on which silicon carbide was deposited to an overall diameter of about 145 microns. The outside surface of the filaments consisted of two layers of pyrolytic carbon and carbon-silicon, with overall thickness of about 3 microns. In air at room temperature these filaments have a tensile strength of about 500 thousand psi and a tensile modulus of about 60 million psi. These filaments have an average thermal expansion coefficient of less than about $5.0 \times 10^{-6}$ in/in$-°$C.

The filaments were cut to a length of about 2 inches and were coated with boron nitride by the following low pressure chemical vapor deposition process utilizing the reaction $B_3N_3H_3Cl_3 \rightarrow 3BN + 3HCl$. Specifically, the filaments were placed on a molybdenum screen which was then positioned at about the midpoint of the hot zone of a pyrex/quartz/pyrex furnace tube. A 1.00 gram sample of commercial trichloroborazine ($B_3N_3H_3Cl_3$) was transferred in an argon-filled glove box to a pyrex end-section which contained a thermocouple vacuum gauge, a cold trap and a vacuum stopcock. The closed pyrex end-section was then taken out of the glove box and attached to an end of the furnace tube and to a vacuum system. The end-section containing the trichloroborazine was then cooled using liquid nitrogen and the furnace tube was opened to the vacuum system via the stopcock of the pyrex end-section.

After the system reached a pressure lower than 0.020 torr, the furnace was heated to about 1050° C. When the pressure had again dropped below 0.020 torr and the furnace temperature had stabilized, the end-section containing the trichloroborazine was warmed by an oil bath maintained at 60° C., whereupon the solid began to vaporize, depositing BN and liberating gaseous HCl in the hot zone of the furnace tube and producing an increase in pressure. The pressure was observed to reach as high as about 200 torr before stabilizing at about 50 torr. After two hours, the pressure was found to have decreased to about 0.020 torr, whereupon the furnace was shut down and the system allowed to cool to room temperature before opening the tube and removing the sample. Identification of the chemically vapor deposited layer as BN was accomplished by means of electrical resistance measurement and a quantitative ESCA analysis of a film deposited in substantially the same manner on a SiC disk surface. This film was amorphous to x-rays in the as-deposited condition and appeared fully dense and smooth at high magnification in the SEM. Scanning electron microscopy observation of the ends of coated and broken filaments revealed that the coating was continuous and smooth and about 1.5 microns thick on the filament and left no significant portion of the filament exposed.

The boron nitride coated filaments were uniaxially aligned by placing them in a device for aligning filaments and maintaining the required spacing between them. This device was made from a copper foil laminated on a printed circuit board which was etched by the photolithographic technique in such a way as to produce parallel grooves about 0.06 inch diameter, 0.0004 inch deep, and 0.0008 inch apart (center-to-center). The coated filaments were placed on this device and a simple scoop of the filaments using a straight edge led to filling of each of the grooves with a filament. This resulted in a single layer of uniformly spaced coated filaments which was lifted off the board by putting adhesive tapes across each end portion of the filament layer. The adhesive tapes were sufficient to maintain the alignment and spacing between the coated filaments in the layer. Several such pre-formed layers of coated filaments were produced in which the coated filaments were substantially parallel and spaced about 100 microns from each other.

The zircon powder had an average size of about 0.5 microns.

By ambient temperature herein it is meant room temperature, i.e. from about 20° C. to about 30° C.

The organic binding material was comprised of commercially available organic binder comprised of polyvinylbutyral (average molecular weight of about 32,000) and commercially available liquid plasticizer comprised of polyunsaturated hydroxylated low-molecular weight organic polymers. Specifically, in Example 1, the organic binding material was comprised of 8.75 grams of polyvinylbutyral and 7.9 grams of liquid plasticizer, and in Example 2 it was comprised of 9.4 grams of polyvinylbutyral and 11.0 grams of liquid plasticizer.

Hot pressing was carried out in a 2 inch inner diameter 2 inch inner length cylindrical die in an atmosphere of flowing nitrogen which was at about atmospheric pressure.

Standard techniques were used to characterize the hot pressed composite for density, microstructure and mechanical properties.

EXAMPLE 1

23.8 grams of the organic binding material were dissolved at ambient temperature in 76.2 grams of a mixture of 53.9 grams of toluene, 18.3 grams of methyl isobutyl ketone, and 4.0 grams of ethyl alcohol. The 70 grams of resulting solution was admixed with 200 grams of zircon powder along with 38 grams of toluene and 0.25 grams of a commercially available organic silicone oil (which can be considered a part of the organic binder) in a ball mill for about 10 hours at room temperature to form a slurry. The slurry was then desired in a vacuum. Each pre-formed layer of filaments was deposited on a Mylar sheet, the slurry was deposited on the filaments using a doctor blade, the cast tape was then dried in air at room temperature and atmospheric pressure to remove the solvent, and the resulting tape was stripped from the Mylar sheet.

The tape was about 6 inches wide and had a substantially uniform thickness of about 0.011 inch. micron powder was distributed therein substantially uniformly.

The tape was cut to the length and width of the aligned layer of filaments. A number of such tapes were produced.

A layered sandwich-type structure was formed comprised of six layers of tape. Before assembly, to enhance adherence, the faces of the tapes which were to be contacted with each other were sprayed with an organic solution of binder, dried for a few seconds in air at room temperature leaving a coating of sticky organic binder. Specifically, a solution comprised of 3 weight % of commercially available polyvinylbutyral (average molecular weight of about 32,000), 39 weight % toluene, 9.5 weight % acetone, 39 weight % xylene and 9.5 weight % ethanol was used. The solution was sprayed on the faces of the tapes for a sufficient time so that upon evaporation of the solvent there remained about 0.2 milligrams of sticky organic binder per square centimeter of surface.

The resulting layered structure was laminated in air in a laminating press at about 93° C. under a pressure of about 1000 psi for about 1 minute. At lamination temperature and pressure, the tapes were plastic resulting in filling of the void space between and around the filaments.

The laminated structure was sliced perpendicular to the filament axis into bar-shaped samples (1.25 inch×0.3 inch×0.15 inch) using a diamond saw. Examination of a cross-section showed uniform spacing between the filaments as well as between the layers of filaments.

The samples were placed in a vacuum oven for removing the organic binding material wherein the vacuum was typically about 20 millitorr. The burnout cycle was comprised of heating the furnace at a rate of 30° C. per hour to 500° C., a five hour hold at 500° C. and a cooldown to room temperature at a rate of 200° C. per hour. This led to complete removal of the organic binding matter from the laminated structure which resulted in a porous structure comprised of zircon powder and filaments.

Each of the porous bar-shaped structures was placed in a graphite die and hot-pressed at about 1580° C. Each sample was heated at a rate of approximately 100° C. per minute to the maximum hot pressing temperature under a pressure of 3500 psi applied for consolidation. The consolidation was monitored by plunger displacement and complete densification occurred within 30 minutes after the onset of densification. After hot-pressing, the sample was furnace cooled to room temperature and removed from the die.

The hot pressed samples, i.e. composites, were characterized and are illustrated in Table I.

The cross section (perpendicular to filament axis) of one of the composites (Example 1C) was examined. It showed uniform spacing between the filaments as well as uniform spacing between layers of filaments which the present composite can have. It also showed that each layer of filaments was maintained in a substantially single plane. In addition, it showed a fully dense zircon matrix surrounding each individual filament and in direct contact therewith. The density of this composite was 4.27 g/cc, in line with fully dense zircon matrix material containing about 25 volume % filaments. No porosity was detected in the composite by microscopy. Zircon has an average thermal expansion coefficient of about $4.8 \times 10^{-6}$ in/in $-°$ C. which is close to that of the silicon carbide filaments.

Some of the composites were broken at room temperature in a three-point-bend configuration to determine fracture strength and load-elongation characteristics. All of the broken composites exhibited filament pullout, i.e. more than 10% by volume of the filaments pulled out and did not break at the plane of fracture. The results for each of the three composites are given in Table I as Examples 1A-1C.

FIG. 1 shows a load deflection curve for the composite of Example 1A. It can be seen that this composite showed toughened ceramic-like behavior. The load-deflection curve shows that at the onset of matrix cracking, the load carrying capability of the composite was maintained for a while reaching an ultimate strength of 101,000 psi (700 MPa) beyond which the composite showed substantial but not complete failure.

For comparison, six tapes of zircon powder alone and organic binder were produced, formed into a layered structure, laminated, heated to remove organic binder, and hot pressed in substantially the same manner as the sample of Example 1A to produce a body (Example 1X in Table I) of substantially the same size and density which was broken in substantially the same manner. Its load deflection curve is also shown in FIG. 1. It fractured in a brittle manner at 35,400 psi (244 MPa).

EXAMPLE 2

This example was carried out in substantially the same manner as Example 1 except as noted herein and in Table I.

Zircon powder and silicon carbide whiskers were used instead of zircon alone in forming the slurry. Specifically, 200 grams of zircon powder and 35 grams of silicon carbide whiskers were mixed by hand. To this 3 grams of organic binder, 83 grams of toluene, and 38 grams of methyl isobutyl ketone were added. This mixture was mixed for 20 minutes using zirconia grinding media on a ball mill. Additional 17.4 grams of binder and 0.2 gram of silicone oil were added to the slurry and the contents were mixed for one hour on a ball mill. The slurry was desired and cast over the deposited filaments on a mylar sheet using a doctor blade.

The dried tape had a thickness of about 0.011 inch.

A number of composites were produced and some were broken. All of the broken composites showed toughened ceramic-like behavior and filament pullout, i.e. more than 10% by volume of the filaments pulled out and did not break in the plane of the fracture. The results for each of the three composites are given as Examples 2A-2C in Table I. Zircon and SiC whiskers have an average thermal expansion coefficient of about $4.8 \times 10^{-6}$ in/in $-°$ C. which is close to that of the filaments.

FIG. 2 shows a load deflection curve for the composite of Example 2A. It can be seen that this composite showed toughened ceramic-like behavior. The load-deflection curve shows the onset of matrix cracking followed by a rise in the load carrying capability of the composite. An ultimate strength of 429 MPa (62,219 psi) was reached beyond which the composite showed substantial but not complete failure.

For comparison, six tapes of organic binder and a mixture of zircon powder and SiC whiskers in an amount of about 15% by weight of the mixture were produced, formed into a layered structure, laminated, heated to remove organic binder, and hot pressed in substantially the same manner as the sample of Example 2A to produce a body (Example 2X in Table I) of substantially the same size and density which was broken in substantially the same manner. Its load deflection curve is also shown in FIG. 2. It fractured in a brittle manner at 320 MPa (46,410 psi).

TABLE 1

| Ex. | Solids in Slurry | Tape Thickness (inch) | BN-Coated Filament Containing Tapes in Layered Structure | Composite Characteristics ||||||
|---|---|---|---|---|---|---|---|---|---|
| | | | | Hot Pressing Temperature (°C.) | Density g/cc | Filaments Vol. % | Avg. Grain Size | Fracture Strength (MPa) | Fracture Strain (%) |
| 1A | zircon | 0.011 | 6 | 1560 | 4.31 | 25 | <5 μm | 700 | 1.4 |
| 1B | zircon | 0.011 | 6 | 1560 | 4.24 | 25 | <5 μm | 650 | 1.0 |
| 1C | zircon | 0.011 | 6 | 1560 | 4.27 | 25 | <5 μm | 700 | 1.2 |
| 1X | zircon | 0.012 | none | 1560 | 4.4 | 0 | <5 μm | 244 | 0.09 |
| 2A | zircon + SiC whiskers | 0.011 | 6 | 1600 | 3.76 | 25 | <5 μm | 429 | 1.4 |
| 2B | zircon + SiC whiskers | 0.011 | 6 | 1600 | 3.80 | 25 | <5 μm | 638 | 1.64 |
| 2C | zircon + SiC whiskers | 0.011 | 6 | 1600 | 3.75 | 25 | <5 μm | 657 | 1.50 |
| 2X | zircon + SiC whiskers | 0.011 | none | 1600 | 3.88 | 0 | <5 μm | 320 | 0.2 |

The composites of Examples 1A, 1B, 1C, 2A, 2B, and 2C illustrate the present invention. The present composites are useful as high temperature structural materials.

What is claimed is:

1. A process for producing a composite comprised of boron nitride coated fibrous material in a ceramic matrix which comprises the following steps:
   (a) providing matrix-forming ceramic particulate material and organic binding material;
   (b) forming a slurry of said matrix-forming material and organic binding material in a liquid medium;
   (c) depositing a coating of boron nitride on fibrous material leaving no significant portion thereof exposed;
   (d) providing said boron nitride coated fibrous material substantially as a layer;
   (e) casting said slurry onto said coated fibrous material in an amount sufficient to form a tape therewith;
   (f) evaporating said liquid medium forming a tape;
   (g) assembling a plurality of said tapes to produce a layered structure;
   (h) laminating the layered structure to form a laminated structure;
   (i) heating said laminated structure to remove said organic binding material leaving no significant deleterious residue; and
   (j) hot pressing the resulting porous structure at a sufficient temperature under a sufficient pressure for a sufficient period of time to consolidate said structure to produce said composite having a porosity of less than about 10% by volume, said composite containing no significant amount of reaction product of said coated fibrous material and said matrix, said ceramic matrix having a thermal expansion coefficient which ranges from lower than that of said coated fibrous material to less than about 15% higher than that of said coated fibrous material, at least about 10% by volume of said composite being comprised of said coated fibrous material.

2. The process according to claim 1, wherein said fibrous material contains at least about 1% by weight of carbon.

3. The process . . . silicon carbide, silicon nitride, and any combinations thereof.

4. The process . . . Si-C-O-metal, Si-C-O-N-metal, and any combinations thereof, where . . . material.

5. The process . . . Si-N-O-metal, Si-C-O-N-metal and any combinations thereof, wherein . . . material.

6. The process according to claim 1, wherein said fibrous material is selected from the group consisting of fibers, filaments, strands, bundles, whiskers, cloth, felt, and any combination thereof.

7. The process according to claim 1, wherein said slurry contains a member selected from the group consisting of whiskers and boron nitride coated whiskers ranging to about 50% by volume of said matrix-forming ceramic material.

8. The process according to claim 1, wherein said matrix-forming material is comprised of an oxide-based crystalline ceramic.

9. The process according to claim 1, wherein said matrix-forming ceramic particulate material is selected from the group consisting of aluminum oxide, mullite, silicon carbide, silicon nitride, and zircon.

10. The process according to claim 1, wherein before said layered structure is assembled, an organic solution of organic binder is sprayed on faces of tapes to be contacted with each other and dried to leave a sticky film of organic binder in amount sufficient to at least significantly enhance adhesion.

11. The process according to claim 1, wherein said matrix has a thermal expansion coefficient ranging from lower than that of said coated fibrous material to about the same as that of said coated fibrous material.

12. The process according to claim 1, wherein said coated fibrous material is comprised of a plurality of continuous coated filaments wherein said coated filaments are spaced from each other.

13. The process according to claim 1, wherein said boron nitride coated fibrous material is comprised of a plurality of continuous coated filaments spaced from each other, and wherein said slurry contains a member selected from the group consisting of whiskers and boron nitride coated whiskers ranging to about 50% by volume of said matrix-forming ceramic material.

14. The process according to claim 1, wherein said matrix-forming ceramic particulate material is mullite.

15. The process according to claim 1, wherein said matrix-forming ceramic particulate material is silicon carbide.

16. The process according to claim 1, wherein said matrix-forming ceramic particulate material is silicon nitride.

17. The process according to claim 1, wherein said slurry contains whiskers ranging to about 50% by volume of said matrix-forming ceramic material.

18. The process according to claim 1, wherein said slurry contains silicon carbide whiskers ranging to about 50% by volume of said matrix-forming ceramic material.

19. The process according to claim 1, wherein said slurry contains silicon nitride whiskers ranging to about 50% by volume of said matrix-forming ceramic material.

20. A process for producing a composite comprised of boron nitride coated fibrous material in a zircon matrix which comprises the following steps:
   (a) providing matrix-forming zircon particulate material and organic binding material;
   (b) forming a slurry of said matrix-forming material and organic binding material in a liquid medium;
   (c) depositing a coating of boron nitride on fibrous material leaving no significant portion thereof exposed;
   (d) providing said boron nitride coated fibrous material substantially as a layer;
   (e) casting said slurry onto said coated fibrous material in an amount sufficient to form a tape therewith;
   (f) evaporating said liquid medium forming a tape;
   (g) assembling a plurality of said tapes to produce a layered structure;
   (h) laminating the layered structure to form a laminated structure;
   (i) heating said laminated structure to remove said organic binding material leaving no significant deleterious residue; and
   (j) hot pressing the resulting porous structure at a sufficient temperature under a sufficient pressure for a sufficient period of time to consolidate said structure to produce said composite having a porosity of less than about 10% by volume, said composite containing no significant amount of reaction product of said coated fibrous material and said matrix, said matrix having a thermal expansion coefficient which ranges from lower than that of said coated fibrous material to less than about 15% higher than that of said coated fibrous material, at least about 10% by volume of said composite being comprised of said coated fibrous material.

21. The process according to claim 20, wherein said fibrous material contains at least about 1% by weight of carbon.

22. The process according to claim 20, wherein said fibrous material is selected from the group consisting of aluminum oxide, mullite, elemental carbon, silicon carbide, silicon nitride, and any combinations thereof.

23. The process according to claim 20, wherein said fibrous material contains at least about 50% by weight of silicon and at least about 25% by weight of carbon based on the weight of said fibrous material and is selected from the group consisting of Si—C—O, Si—C—O—N, Si—C—O—Metal, Si—C—O—N—Metal, and any combinations thereof, wherein said O, N and metal are each present in an amount of at least about 1% by weight of said fibrous material.

24. The process according to claim 20, wherein said fibrous material contains at least about 50% by weight of silicon and at least about 25% by weight of nitrogen based on the weight of said fibrous material and is selected from the group consisting of Si—N—O, Si—C—O—N, Si—N—O—Metal, Si—C—O—N—Metal, and any combinations thereof, wherein said O, C and Metal are each present in an amount of at least about 1% by weight of said fibrous material.

25. The process according to claim 20, wherein said fibrous material is selected from the group consisting of fibrous, filaments, strands, bundles, whiskers, cloth, felt, and any combinations thereof.

26. The process according to claim 20, wherein said slurry contains boron nitride coated whiskers ranging to about 50% by volume of said matrix-forming zircon material.

27. The process according to claim 20, wherein said coated fibrous material is comprised of a plurality of continuous coated filaments wherein said coated filaments are spaced from each other.

28. The process according to claim 20, wherein said boron nitride coated fibrous material is comprised of a plurality of continuous coated filaments spaced from each other, and wherein said slurry contains a member selected from the group consisting of whiskers and boron nitride coated whiskers ranging to about 50% by volume of said matrix-forming zircon material.

29. The process according to claim 20, wherein said slurry contains whiskers ranging to about 50% by volume of said matrix-forming zircon material.

30. The process according to claim 20, wherein said slurry contains silicon carbide whiskers ranging to about 50% by volume of said matrix-forming zircon material.

31. The process according to claim 20, wherein said slurry contains silicon nitride whiskers ranging to about 50% by volume of said matrix-forming zircon material.

32. A process for producing a composite comprised of boron nitride coated fibrous material in an aluminum oxide matrix which comprises the following steps:
(a) providing matrix-forming aluminum oxide particulate material and organic binding material;
(b) forming a slurry of said matrix-forming material and organic binding material in a liquid medium;
(c) depositing a coated of boron nitride on fibrous material leaving no significant portion thereof exposed;
(d) providing said boron nitride coated fibrous material substantially as a layer;
(e) casting said slurry onto said coated fibrous material in an amount sufficient to form a tape therewith;
(f) evaporating said liquid medium forming a tape;
(g) assembling a plurality of said tapes to produce a layered structure;
(h) laminating the layered structure to form a laminated structure;
(i) heating said laminated structure to remove said organic binding material leaving no significant deleterious residue; and
(j) hot pressing the resulting porous structure at a sufficient temperature under a sufficient pressure for a sufficient period of time to consolidate said structure to produce said composite having a porosity of less than about 10% by volume, said composite containing no significant amount of reaction product of said coated fibrous material and said matrix, said matrix having a thermal expansion coefficient which ranges from lower than that of said coated fibrous material to less than about 15% higher than that of said coated fibrous material, at least about 10% by volume of said composite being comprised of said coated fibrous material.

* * * * *